Dec. 3, 1940.     R. J. KOUPAL ET AL     2,223,623
METHOD AND APPARATUS FOR FILTERING LIQUIDS
Filed Jan. 27, 1937     3 Sheets-Sheet 1
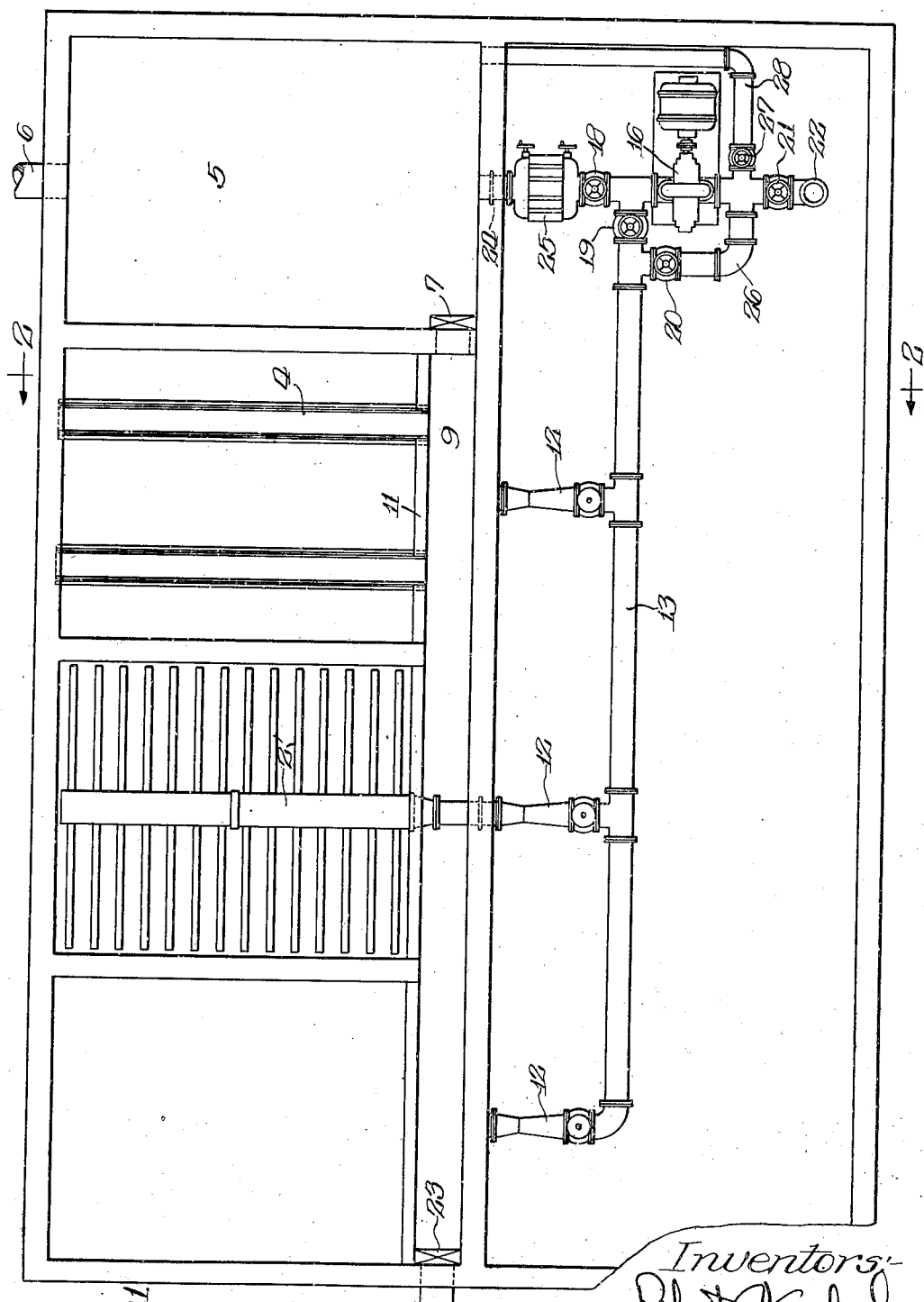

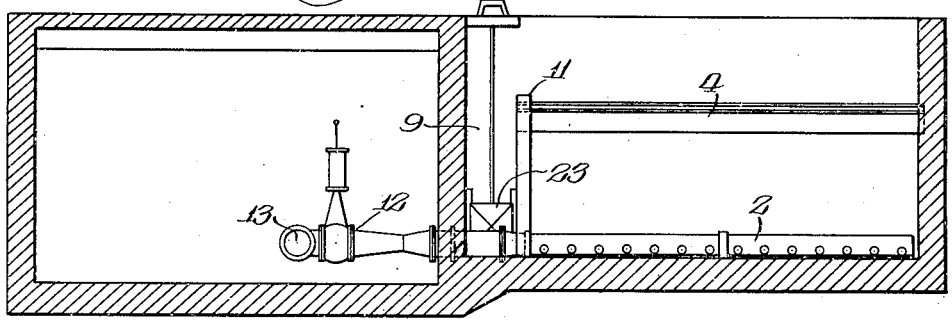
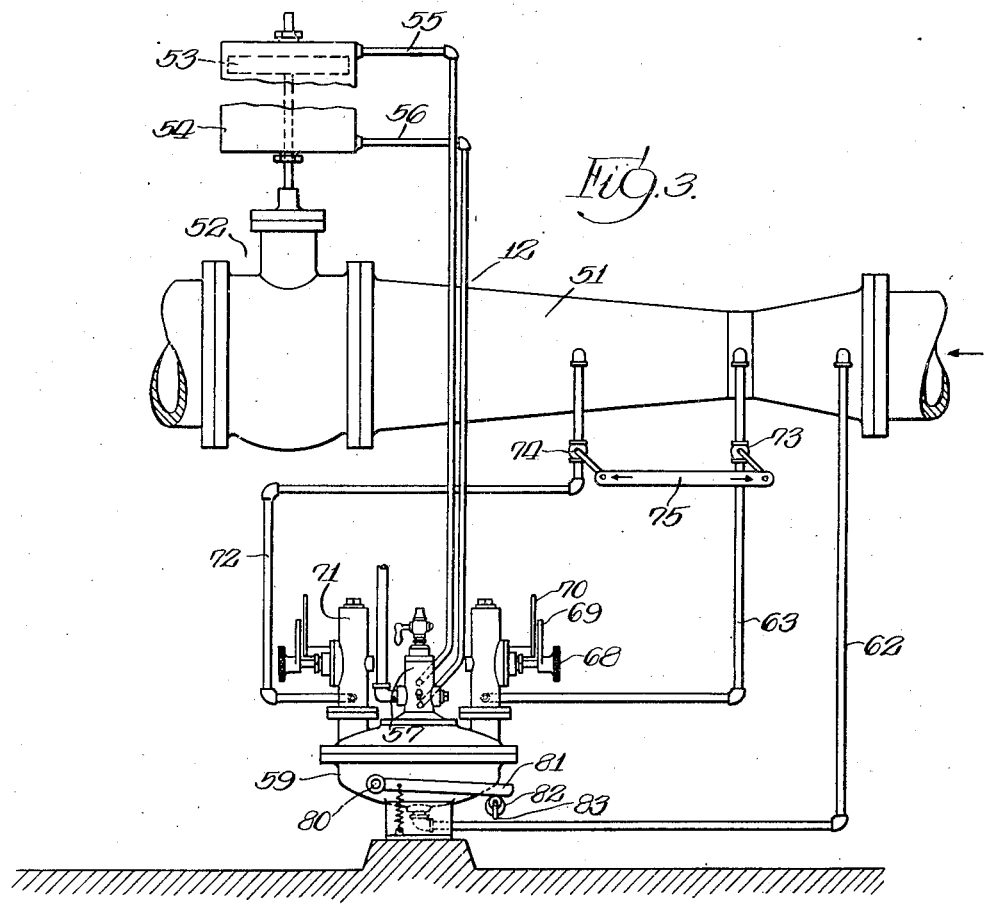

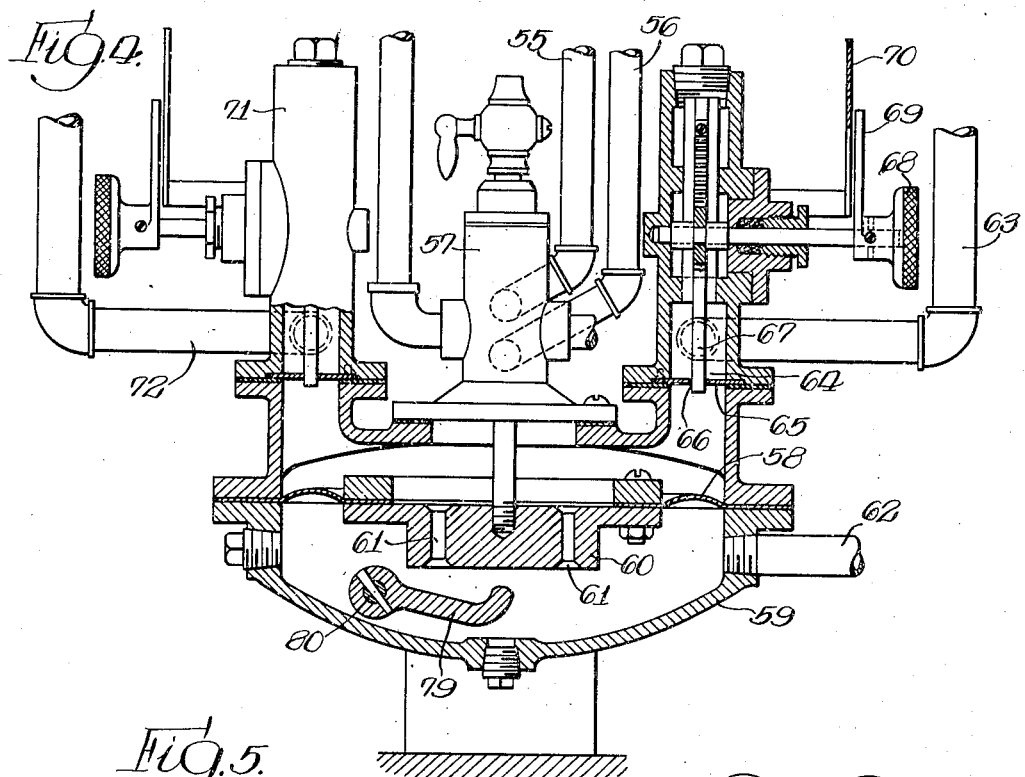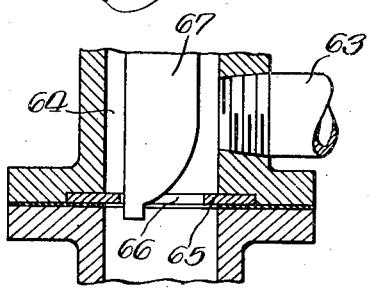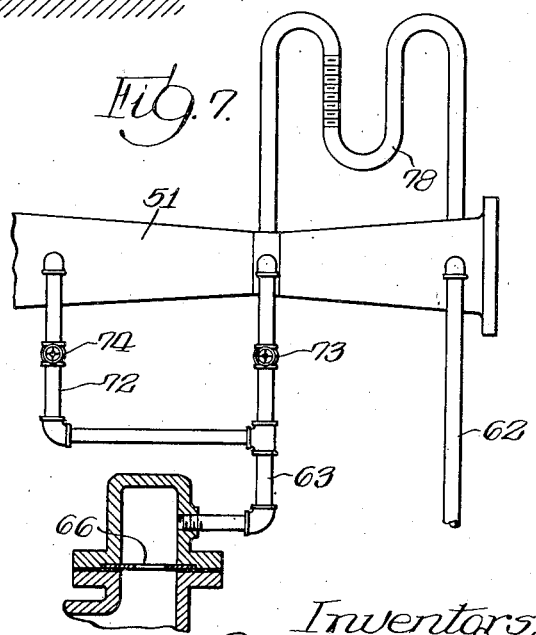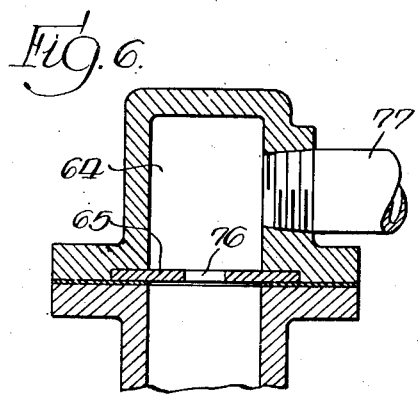

Patented Dec. 3, 1940

2,223,623

UNITED STATES PATENT OFFICE 2,223,623

METHOD AND APPARATUS FOR FILTERING LIQUIDS

Robert J. Koupal and Walter H. Green, Chicago, Ill., assignors to International Filter Co., Chicago, Ill., a corporation of Delaware Application January 27, 1937, Serial No. 122,549

5 Claims. (Cl. 210—122.1)

This invention has to do with filtering systems and has for a general purpose to improve and simplify both the construction of such systems and the operation thereof. Associated with and contributing to this general object are particular objects directed to various aspects of such a system. One such particular object is to provide a construction and operation wherein parts serve double purposes or are used for different functions in different steps of the operating cycle so as to permit elimination of one or more other parts commonly necessary. Another is to provide certain parts so modified in form from that heretofore used that they are capable of functioning in two ways and so serve a double purpose. Other objects will be mentioned later or will become apparent on consideration of this disclosure.

For purposes of exemplification and to make our invention and its application readily understood we will describe it in connection with a gravity type filtering system such as may be used in connection with a swimming pool although of course it is not limited to that type of filter or that application. Such a plant comprising three filter units is illustrated although of course there may be more or less than this number of units.

The construction and operation of such filters and such plants is in general well understood and will not be described in detail nor illustrated except in so far as may seem necessary or desirable to point out what is new and to make our invention clear.

In the accompanying drawings Fig. 1 is a plan view of a system comprising three filter units and embodying my invention. Fig. 2 is a sectional view on line 2—2 of Fig. 1. Fig. 3 is a view of the controlling unit used for flow control. Fig. 4 shows a partly sectional view of part of the apparatus of Fig. 3. Fig. 5 is a partial sectional view of one part of the rate setting device shown in Fig. 4. Fig. 6 is a modified form of the device illustrated in Fig. 5. Fig. 7 illustrates another way in which the rate may be set on a controller such as that illustrated.

As ordinarily constructed a battery of filters of the type shown in Fig. 1 will be served by four header conduits; one for supply of influent raw water, a second for the effluent flow of filtered water, a third for delivery of wash water under pressure to the units and a fourth for outflow of waste water. Each of these headers will be joined to each of the units by branch pipes and each branch is provided with a valve. In addition there may be a fifth branch with valve to permit filtered water to be diverted to the waste header. In each branch through which the effluent filtered water flows to the filtered water header there is usually a controller by which the rate of effluent flow and so the rate of filtration is set for each unit. In the wash water header there is desirably and commonly a controller to govern the flow of wash water at the desired rate, this controller being placed ahead of the first branch so as to serve all units. In each operating cycle of such a plant each of these valves on each unit must in its turn be opened and closed. To prevent confusion and misdirecting of flows indicators are commonly provided on each valve to indicate its position. The valves may be hand operated but particularly where they are of larger size they are commonly hydraulically or electrically operated and then some sort of control for conveniently doing this is also provided. Consideration of the following disclosure will make apparent the great degree of simplification both in construction and operation, afforded by our improved system.

In the drawings 6 represents a conduit delivering water to be filtered from a source of supply, in this case assumed to be a pool, to the basin 5 which may be a grit or coagulating chamber. From 5 the water enters the conduit 9 through sluice gate 7. Conduit 9 is here shown as a flume but a pipe may be used. From 9 the water enters the space over the filter beds either through troughs 4 or by flow over the breast wall 11 that forms one side of flume 9. During the filtering operation the water passes down through the filter bed, not shown, but which may be the ordinary sand bed supported on gravel, to the collector and distributor piping 2 that comprises the usual header and laterals. The headers extend out through the front wall and are attached to flow controllers 12 through which filtered water passes to conduit 13. Conduit 13 leads through valve 19 to the suction of pump 16 by which the water is returned to the pool or other point of storage or use through valve 21 and pipe 22.

When it is desired to wash the filters the sluice gate 7 is closed to cut off the supply to the filters after which filtration may proceed for a time to lower the water level somewhat above the beds of the filters and thus save water, or drain valve 23 may be opened to drain water to waste down to the level of troughs 4. Preliminary to the washing valves 19 and 21 will have been closed and valves 18 and 20 opened. This permits water for washing to be drawn by the pump from basin 5 through conduit 24 and strainer 25 and discharged through bypass 26 into conduit 13 which thus serves both as filtered water effluent and as wash water conduit.

As it is necessary or very desirable to control the wash flow we use the controllers 12 for this purpose also and to do this involves certain changes therein that will be referred to later and which form part of our invention.

Since the flow required to wash a filter bed is several times the normal filtering flow through it, usually about five times as great, the pump and the pipe 13 would have to be excessively large to carry the flow were all the beds washed simultaneously, as would also the conduit 9 and drain 23 and other parts. Also it is not usual to have available a sufficient supply of wash water, consequently the filters are washed one at a time. This necessitates that the wash flow be confined to one bed at a time and for this purpose the regulating valves of the controllers 12 are used in a manner to be described later. During the washing operation flow to two of the beds will thus be cut off while a third is being washed, the wash water entering the distributing piping under each bed in turn by a back flow from 13 through its controller 12 and rising up through the filter bed will carry away the accumulated dirt to waste by overflowing into its troughs 4 which lead to flume 9 and so to waste through 23.

After all the filters have been washed the system may be restored to the filtering cycle, which is done by permitting the valves on all the controllers to resume their controlling function, closing valves 23, 20, and 18 and opening valves 7, 19, and 21.

It is sometimes desired to permit filters to operate for a short time after washing and to divert this filtered water from service, usually to waste. This period is commonly called the rewash period. Provision is made for rewash in our system without waste of water. To do this we provide the pipe 28 and valve 27, leading from the discharge side of the pump inside of valve 21 to the basin 5. When it is desired to rewash the filters the valve 27 will be opened when filtering is resumed, instead of valve 21, directing the filtered water back to 5 until conditions are normal. Upon completion of the rewash valve 27 will be closed and valve 21 opened so that filtered water will again be delivered to conduit 22.

With our system after the valves at the pump and on flume 9 have been properly set any number of filters may be washed individually and successively and then restored to filtering operation, by manipulation of only the one valve on the controller associated with each. The rewashing of all units is controlled simultaneously by means of valve 27, instead of one at a time by manipulating a valve at each. It will be apparent that this much simplifies operation and saves much time. The pump 16 may be stopped if desired while the valves 18, 19, 20, and 21 are being positioned to change between filtering and washing steps but this is not ordinarily necessary. Attention is called to the strainer 25 provided in the line leading from basin 5 to pump 16. This may be omitted in some services but is desirable when the system serves a swimming pool, since the water coming from the pool to basin 5 usually carries hair and lint that should be kept out of the pump. It is to be understood also that the basin 5 is not essential but may be omitted, the pipe 6 leading directly to valve 7 and being joined also to strainer 25.

It is to be understood that in such a system the construction of the filter beds themselves may be of any of the usual forms and also that the operating cycle comprises the usual steps of filtration, backwashing, etc., may be carried out over the customary periods, in normal sequence with flows at customary rates, etc. We are not proposing any essential change in such respects our invention being directed to certain simplifications and improvements of apparatus and operation as pointed out.

It will be apparent that the controllers 12 are an important part of a system such as that described, it being impossible to construct and operate a system as shown unless they will function as required. In order that they may do this it is necessary to provide controllers differing from those ordinarily employed in filter plants and our invention is directed also to the provision of controllers adapted to the present requirement. In ordinary filter plants the effluent controller on each filter unit has but one function which is to maintain a set rate of effluent flow during filtration. This flow while naturally greater or less on filters of different size, and so requiring larger or smaller controllers accordingly, does not vary much on a given unit. The controllers used are commonly made to govern the flow to a normal rate that is usually either two or three gallons per minute per square foot of filter area, and capable of adjustment over a range of 50% above and below the normal.

As noted above it is customary to provide in filter plants a controller common to all units for the wash flow, this being placed in the wash water header leading to all and before the branch leading to the first unit. As is well known the wash flow is at a much higher rate than the filtering flow, this being necessary to properly scour and clean the bed. A wash flow of about fifteen gallons per square foot of filtering area of the unit is the common rate. While the wash flow used on different plants may be somewhat above or below this rate, it is seldom necessary to vary the wash rate much on any plant, that is, not much over or under what may be called the normal wash rate.

This difference in flow rate for the two controllers that ordinarily are used to serve a unit during the two steps of the cycle does not involve any change in principle of operation and not necessarily or ordinarily any difference in construction except those of size in proportion to the volumes of flow to be controlled. Practically speaking in all such controllers there is utilized the one principle of deriving a differential head from the flow that is to be governed and utilizing this head in some way to control the flow. Such controllers are well known, there being a number of makes on the market, and almost any of these may, by changes that will be apparent from what follows, be adapted for use in our system. While this is true we prefer to use a controller involving the principle shown in Patent 1,934,759 as this lends itself better to our purpose and such a controller is used herein for illustrative purposes and reference is made to that patent.

In the various controllers used in filter plants a derived differential is applied to a diaphragm which is operatively so joined to other parts as to effect the control. To be sufficiently sensitive such diaphragms must be quite flexible and if the applied differential be too great they may be distorted or ruptured. Because of this the derived differential is kept as low as is permissible. Furthermore since the differential derived by a Venturi tube or by an orifice, one of which is commonly used, varies as the square of the flow, it is obvious that if the range of flow be great the differential is likely to be at times either dangerously high or else too low for effective control and this is the reason such controllers are not ordinarily made for a range of control much greater than about 50% above and below the normal, which in turn means a differential variation over a range of about nine to one, this being about the practical range of the usual controller. In the present case, however, it is desired to govern two flows by the same controller, where one flow may have a normal value of two and the other of about fifteen, which means the derived differentials at the normal rates will be in the ratio of about one to fifty-six, with a much higher ratio than this if maximum and minimum flows be considered. To meet similar conditions it has been heretofore proposed to provide two or more differential deriving devices, side by side or one within another, and to use one of these for high flows and another for low flows. While such a scheme could be used in our system we propose to do it in a more simple way by using but one differential deriving device but to selectively take off different differentials from it or to modify a differential after it has been taken off. It is to be noted that one reason we prefer to use the type of controller illustrated in the patent referred to is that in it the differential normally existing on the diaphragm is the same for all rates of flow. While this does permit the deriving of higher differentials in that controller yet these should not be excessive since during periods of rapidly changing flows too large a proportion of the derived differential may reach the diaphragm.

In Figs. 3, 4, 5, and 6 we illustrate a controller utilizing the principle of the patent referred to but with construction modified as we prefer to adapt it for use in our improved system. As shown in that patent the utilized differential is applied to a diaphragm that is joined directly to the governing valve. While that form could be used here we prefer instead to apply the differential to a diaphragm which positions a pilot valve which in turn governs the flow of water to and from a hydraulic cylinder to position a valve.

In these figures 12 indicates generally a controller comprising the Venturi tube 51 and the regulating valve 52 which is joined to and actuated by piston 53 in hydraulic cylinder 54. Valve 52 is preferably of a tight closing type. Pipes 55 and 56 lead from the ends of this cylinder to a pilot valve indicated generally at 57. This pilot valve is of the usual type, having a neutral position wherein all flows are shut off, and admitting pressure water to one end of the hydraulic cylinder and permitting escape of waste water from the other end, according to whether it is moved up or down from neutral. Such pilot valves are well known so no detailed description is necessary and for simplification it is omitted. The form of the pilot here used is such as to control the flows through it to close valve 52 when the pilot is above neutral position and reversely to open it when the pilot is below neutral.

Pilot 57 is joined to diaphragm 58 in casing 59. Attached to diaphragm 58 is a suitable weight 60 which is pierced by orifices 61 that permit flow from the chamber below the diaphragm to the chamber above it. The lower diaphragm chamber is joined to the full section of the Venturi tube by pipe 62. The upper diaphragm chamber is joined to the throat of the Venturi tube by pipe 63. This pipe does not enter the diaphragm casing directly but is joined to a chamber 64 above the orifice plate 65 in which plate is the orifice 66. A shaped plunger 67 is adjustable in orifice 66 by the wheel 68, to which is attached the pointer 69 moving across the graduated scale 70.

If flow now takes place through tube 51 the differential will cause a flow from the tube through pipe 62, the lower diaphragm chamber, orifices 61, the upper diaphragm chamber, orifice 66, chamber 64 and pipe 63, back to the tube. The pipes 62 and 63 are relatively short and large enough in cross-sectional area to afford no appreciable resistance to flow. Except for the presence of orifices 61 the pressures above and below the diaphragm would differ by the same amount as those at the full section and throat of the tube. The presence of these orifices permits a flow and so modifies the pressures and these may be further modified by the positioning of the shaped plunger 67 to control the area of orifice 66. In practice the value of the weight 60 and associated parts, the total area of the orifices 61 and the area of the orifice 66 are related and are made such that when the flow through the tube 51 is at a point somewhat below the minimum intended regulated flow, and with plunger 67 retracted, the pressure below the diaphragm will be in excess by an amount sufficient to lift the weight and move the pilot valve.

As noted above when diaphragm 58 is low pilot 57 is in position to open valve 52 and as the diaphragm rises it moves the pilot to its neutral position and then to that to close valve 52. Consequently when with a setting and flow as referred to just above the diaphragm moves the pilot valve the valve 52 will be moved to close and this will restrict the flow through the venturi, decreasing the derived differential and thus that across diaphragm 58 which ultimately will come to rest with the pilot in neutral and with such a flow value through the venturi as to just sustain the diaphragm and weight. If now the plunger 67 be moved downward to restrict orifice 66 somewhat this equilibrium will be upset, since there is no longer as free a flow from the upper diaphragm chamber and consequently the pressure in it will approach that in the lower chamber. This causes the diaphragm to drop and thus position the pilot to open valve 52. This permits increased flow through the venturi causing a pressure drop at the throat thereof, which reaching back through pipe 63, chamber 64, and orifice 66 will lower the pressure in the upper diaphragm chamber and equilibrium will again be restored with a new flow value through the tube. It is thus apparent that by varying the effective area of the orifice 66 by means of the plunger 67 the controller may be set to govern to any desired rate of flow and that this may be indicated on the suitable calibrated dial 70 by the pointer 69 that is attached to the setting wheel 68. Controllers as so far described are well known in the art, having been in quite extended use for some 70 years.

When such controllers have heretofore been used it has been for the governing of a single flow and only over a relatively narrow range as referred to above, whereas in the present case it is necessary to govern two flows, and these flows are of very substantially different values and also in different directions. To accomplish this we provide selective or modifying means preferably including a second rate setting device designated generally at 71, and which has parts 64—70 as above described. This second rate setter is connected to the Venturi tube 51 by a pipe 72, which is shown joined to the tube not at the throat section thereof but at a point of larger cross-sectional area such that the differential between it and the full section will at the normal higher flow to be governed, be of the same order as that derived between the throat and full section at the normal lower flow. In the apparatus as shown the normal low flow is that during filtering and is from right to left in Fig. 3, and the high flow, that during washing, is from left to right. The differential derived in a Venturi tube is not however a matter of the direction of flow but of the rate of flow and consequently the operation is not changed because of the direction of flow and the device 71 may be used in the manner above described to set the second flow. Valves 73 and 74 are shown in the pipes 63 and 72 so that one or the other may be cut off according to the service, and these valves are preferably joined as by a link 75 to operate them together and avoid error..

If it is not necessary to vary the setting of a flow but it may be at some fixed value, the relatively complicated rate setting device described above and illustrated in Figs. 3, 4, and 5 may be omitted and the more simple device shown in Fig. 6 put in place thereof. In such case the orifice plate 65 is provided with an orifice 76 corresponding to the flow desired. Such a device may be put in place of one or both of the rate setting devices shown in Fig. 3, the pipe 77, corresponding to 63 or 72, being joined to the Venturi tube to correspond. If however no adjustment is desired on either flow the apparatus may be still further simplified for then only one such orifice 76 need be provided and both pipes 63 and 72 led to it, the valves 73 and 74 permitting either flow to be selected. By a similar arrangement both flows can be set by one adjustable orifice although that is not ordinarily desirable as it requires too frequent adjustment. In such case the dial 70 will have a double calibration.

In Fig. 7 is shown another modification whereby the control may be shifted from one flow to another and modified or adjusted for either flow. In this only one orifice 66 is used which may be but need not be adjustable. The two pipes 72 and 63 are joined intermediate the Venturi tube and the orifice 66 and the two valves 73 and 74 are or may be operated independently. With this construction one derived differential may be used to modify the other and affect the governing of the flow accordingly. Because of difficulties involved in providing a rate setting dial with this arrangement, since various combined settings of the valves 73 and 74 may produce the same total effect, it is better to provide with it a flow indicating gauge, such as the graduated U tube 78.

It was noted above that as or when flow through the venturi falls below the set rate, diaphragm 58 falls shifting the pilot to open valve 52. It follows that on cessation of flow valve 52 will open wide. In order to cause this valve to close when desired and thus cut off flow, there is provided within the diaphragm chamber the finger 79, mounted on a shaft 80 that extends out through the diaphragm casing and which is joined without to one end of lever 81. The other end of 81 rests on the cam 82 turned by handle 83. With the cam and lever in the position shown in Fig. 3 the finger 79 is dropped away from diaphragm 58 which is free to move. If however cam 82 be turned to raise lever 81 and with it finger 79 the diaphragm will be raised and this shifts the pilot valve to close valve 52. Thus by turning the several cams 82 on the various units as desired flow may be permitted or cut off from them severally and by the means described above the value of a permitted flow may be governed.

It will be understood that with such a controller mounted as indicated in Fig. 1 the flow will sometimes be in one direction and sometimes the other. Thus during the filtering period which is the time of lower flow, the flow will be in the direction of the arrow at the right in Fig. 3. At this time valve 73 will be open and 74 closed. During washing the flow is in the opposite direction and valve 74 will be open and 73 closed. As however the value of the derived differential is not a matter of the direction of flow but only of the rate of flow, the controller will operate with the flow in either direction.

In operation when it is desired to wash the filters the attendant will raise all the levers 81 to close the valves on all the controllers, reset valves 73 and 74 and position the valves on the main flow conduits to wash as previously referred to. Lever 81 is then lowered on the filter to be first washed and when washing is completed it is again raised and lever 81 lowered on a second filter and so on until all have been washed when the system may be restored to filtering as above described. Attention is called to the fact that when a filter is to be washed the valve 52 of the controller governing flow to it is closed and that in regulating to the set wash flow rate it does so from this position, thus preventing a sudden inrush of wash water which has been found to be very objectionable as tending to disrupt the bed.

We have shown our system as entirely hand operated, so that it is necessary for the attendant to go to each valve to open or close it. While thus illustrated in a most simple form it will be understood that such immediate hand operation of parts is not necessary. The valves may be operated remotely from a control table by mechanical, hydraulic, or electrical means as is frequently done, and the control may be to a greater or less extent automatic. We have thought it unnecessary and as merely introducing complications to describe such means of control as applied to our system since they are well known and their application involves no difficulty to one familiar with the art. It is to be understood that our invention is not limited by the particular form thereof and herein for illustrative purpose.

Having described our invention, we claim:

1. In a filter system, a filter, a conduit for the flow of filtered water from and for the flow of wash water to said filter, means forming part of said conduit and adapted to create pressure differentials in said flows, a pressure differential responsive device, adjustable means to transmit differential pressures, derived from one point of flow through said conduit, to said differential responsive device, adjustable means to transmit differential pressures, derived from another point of flow through said conduit, to said differential responsive device, means to render one of said transmitting means operative and the other inoperative and vice versa, when stopping one of said flows and starting another, and flow-controlling means forming part of said conduit and controlled from said pressure differential responsive device.

2. In a filter system, a filter, a conduit for the flow of filtered water from and for the flow of wash water to said filter, means incorporated in said conduit and acted upon by the water flowing therein to create pressure differentials in said flows, a pressure differential responsive device, a plurality of alternatively operable pressure differential transmitting, and modifying means joining said differential creating means to said differential responsive device, and flow-controlling means forming part of said conduit and controlled from said pressure differential responsive device to control the flow of filtered water in accordance with pressure differentials transmitted by one of said pressure differential transmitting means, and to control the flow of wash water in accordance with pressure differentials transmitted by the other of said means.

3. In a filter system, a filter, a conduit through which filtered water flows from and wash water flows to said filter, a Venturi tube in said conduit, said Venturi tube having a full section, a throat section and a section intermediate the full and throat sections, three leads joining respectively said three sections, a pressure differential responsive device, individually operable connections between each of said throat and intermediate section leads and said differential responsive device, a connection between said full section lead and said differential responsive device, and flow-controlling means on said conduit controlled from said pressure differential responsive device.

4. In a filter system, a filter, conduits for the flow of filtered water from said filter and for the flow of wash water to said filter, means to create pressure differentials in said flows, a common pressure differential responsive device, means joining said differential creating means to said differential responsive device and including means to electively derive pressure differentials at certain ratios from said several flows, and means controlled from said differential responsive device and adapted to control operative means associated with said flows.

5. In a filtering system comprising a plurality of filter units, a common header conduit for the flow of filtered water from and for the flow of wash water to such units, branch conduits for said flows intermediate said header and each unit, pressure differential creating means in said flows, associated with each unit, a common pressure differential responsive device associated with each unit, means joining said differential creating means to said respective differential responsive devices and including means to electively derive pressure differentials at certain ratios from said several flows, and means controlled from said differential responsive devices and adapted to control operative means associated with said several flows.

ROBERT J. KOUPAL.
WALTER H. GREEN.